United States Patent
Goldman et al.

(10) Patent No.: US 8,356,358 B2
(45) Date of Patent: Jan. 15, 2013

(54) PREVENTING INFORMATION LEAKAGE BETWEEN COMPONENTS ON A PROGRAMMABLE CHIP IN THE PRESENCE OF FAULTS

(75) Inventors: David Samuel Goldman, Thornhill (CA); Mark Bourgeault, Mississauga (CA)

(73) Assignee: Altera Corporation, San Jose, CA (US)

( * ) Notice: Subject to any disclaimer, the term of this patent is extended or adjusted under 35 U.S.C. 154(b) by 314 days.

(21) Appl. No.: 12/631,588

(22) Filed: Dec. 4, 2009

(65) Prior Publication Data

US 2011/0138223 A1    Jun. 9, 2011

(51) Int. Cl.
    *G06F 17/50*      (2006.01)
    *G06F 21/00*      (2006.01)
(52) U.S. Cl. ............................... 726/26; 726/32; 716/126
(58) Field of Classification Search ........................ 714/10
See application file for complete search history.

(56) References Cited

U.S. PATENT DOCUMENTS

| | | | |
|---|---|---|---|
| 2003/0126195 A1* | 7/2003 | Reynolds et al. ............. | 709/203 |
| 2006/0090081 A1 | 4/2006 | Baentsch et al. | |
| 2007/0022469 A1 | 1/2007 | Cooper et al. | |
| 2007/0277001 A1 | 11/2007 | Mevergnies et al. | |

FOREIGN PATENT DOCUMENTS

| | | | |
|---|---|---|---|
| WO | 2009/079050 | A2 | 6/2009 |
| WO | WO 2009/079050 | * | 6/2009 |

OTHER PUBLICATIONS

M. McLean and J. Moore, "FPGA-Based Single Chip Cryptographic Solution," Military Embedded Systems, Mar. 2007, http://www.mil-embedded.com/articles/id?2069.
International Search Report and Written Opinion dated Feb. 15, 2011, from Application No. PCT/US2010/058873.

* cited by examiner

*Primary Examiner* — Gilberto Barron, Jr.
*Assistant Examiner* — Devin Almeida
(74) *Attorney, Agent, or Firm* — Kwan & Olynick LLP

(57) ABSTRACT

Mechanisms are provided to prevent information leakage between components implemented on a programmable chip such as a Field Programmable Gate Array (FPGA). An automated routing algorithm is effective at enforcing security restrictions with minimal input form the user while providing efficient utilization of the device. Compatible sets of signals are identified and locked, and reservations of routing resources are generated. Remaining signals are rerouted until all signal constraints are met. Specified security constraints with one or more security levels and one or more secure regions may be applied through iterations of the automated routing mechanism.

20 Claims, 11 Drawing Sheets

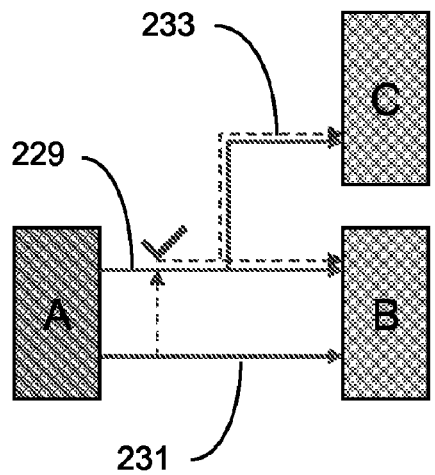
Figure 2G
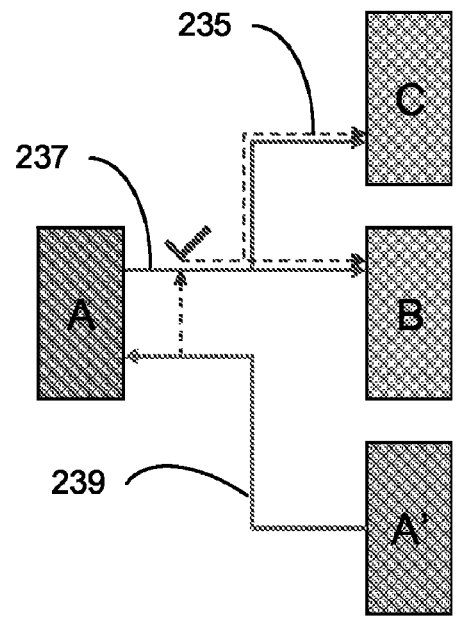
Figure 2H
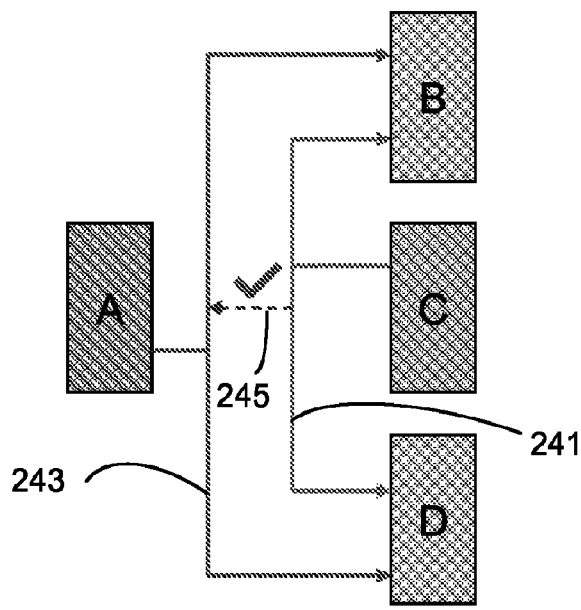
Figure 2I
Figure 2J

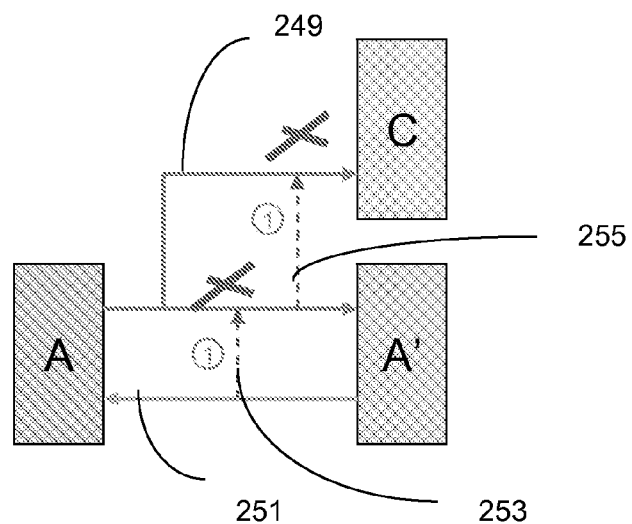
Figure 2K
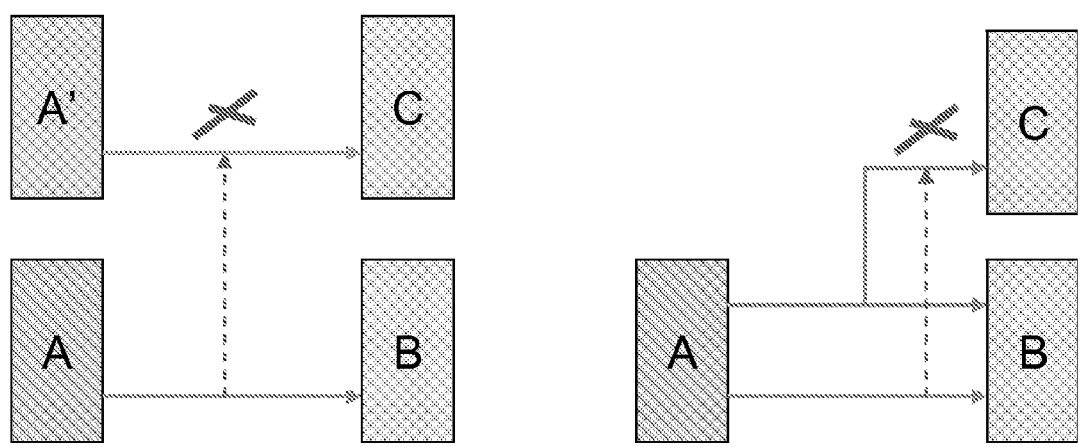
Figure 2L
Figure 2M

PREVENTING INFORMATION LEAKAGE BETWEEN COMPONENTS ON A PROGRAMMABLE CHIP IN THE PRESENCE OF FAULTS

TECHNICAL FIELD

The present disclosure relates to separating distinct intellectual property (IP) components to prevent information leakage.

DESCRIPTION OF RELATED ART

Device designers often implement secure components such as cryptographic components and non-secure components such as radio components on the same chip. Information exchanges between secure and non-secure components are carefully controlled. By isolating secure components, the probability of unintended information leakage is reduced from one type of component to another type on a single chip, even in the potential presence of on-chip faults.

On-chip faults may be hard faults or soft faults. An example of a soft fault is a single event upset (SEU) and an example of a hard fault is physical short between conductors. A goal is to maintain component separation even in the presence of hard faults and soft faults.

Existing electronic design automation (EDA) tools require the user to isolate secure components through careful floorplanning The user explicitly specifies where each signal on chip may route. However, floorplanning has significant limitations. Consequently, it is desirable to provide improved mechanisms for preventing information leakage in the presence of faults.

BRIEF DESCRIPTION OF THE DRAWINGS

The disclosure may best be understood by reference to the following description taken in conjunction with the accompanying drawings, which illustrate particular embodiments of the present invention.

FIG. 2A to 2M are diagrammatic representations showing information exchange between components along legal and illegal routes.

DESCRIPTION OF PARTICULAR EMBODIMENTS

Figure 1:
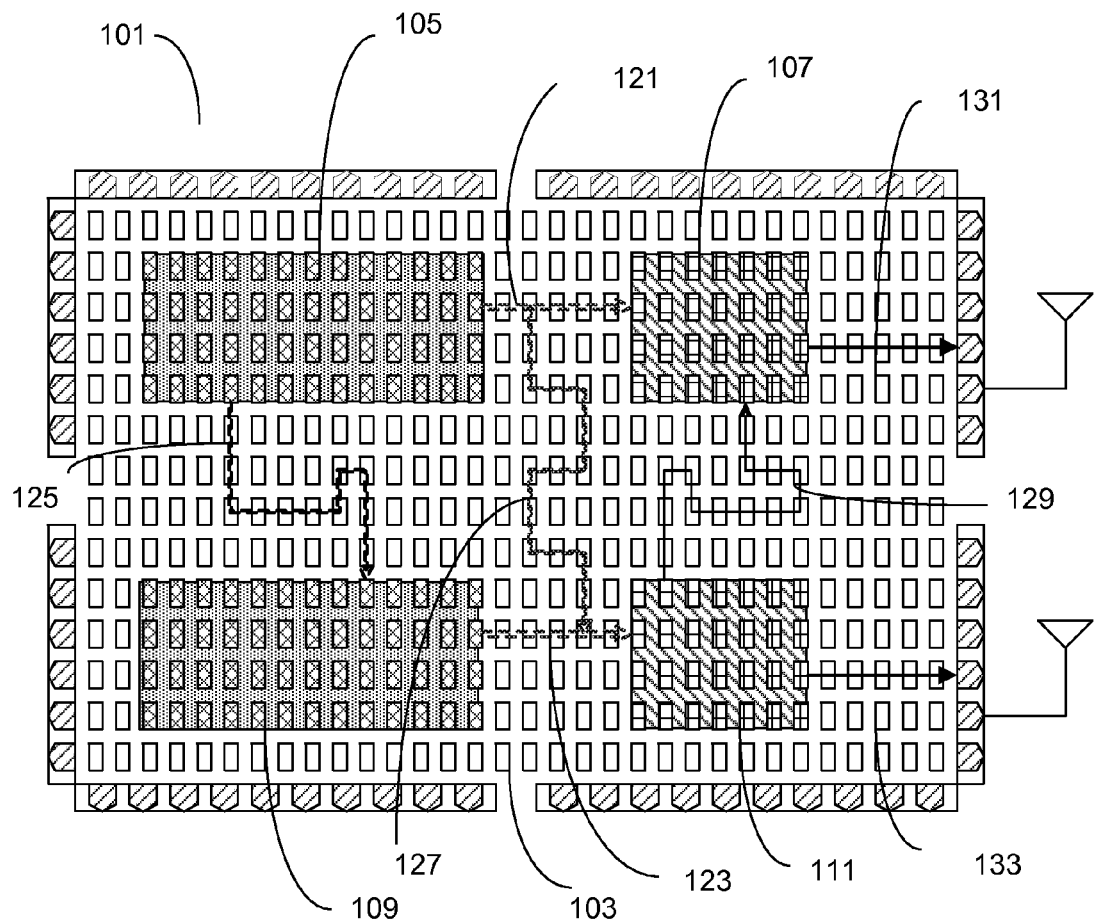
FIG. 1 is a diagrammatic representation of a programmable chip having secure and non-secure regions.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of devices. However, it should be noted that the techniques and mechanisms of the present invention apply to a variety of different types of devices. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to prevent information leakage between components implemented on a programmable chip such as a Field Programmable Gate Array (FPGA). An automated routing algorithm is effective at enforcing security restrictions with minimal input form the user while providing efficient utilization of the device. Compatible sets of signals are identified and locked, and reservations of routing resources are generated. Remaining signals are rerouted until all signal constraints are met. Specified security constraints with one or more security levels and one or more secure regions may be applied through iterations of the automated routing mechanism.

Particular Embodiments

Information can potentially leak from intellectual property (IP) components in an electronic device, such as a Field Programmable Gate Array (FPGA). To prevent leakage, some secured IP components are isolated so that information does not leak into unsecured destinations. A common terminology for this type of separation is red/black separation, where "red" components are those that contain classified plaintext, and "black" components for those that do not. The purpose would be to prevent any non-encrypted information from inadvertently leaking between a red component and a black component. An example would be a radio transmitter/receiver that receives encrypted messages in black components and decrypts the messages in red components. Once the messages are decrypted, they are isolated from black components so that classified plaintext is not inadvertently leaked.

As well, designers may choose to implement redundancy in their designs for the purposes of ensuring continuous operation in the presence of potential on-chip faults. One example of this would be a triple redundancy design, where the user would implement three copies of the same component and then use the majority of three identical outputs as the correct output. The device is also alerted to failure when one component fails to return the same result as the other two. In this case, it is important that each component fail independently—no on-chip fault should cause two regions to fail simultaneously. These are also considered secured components, which require isolation.

Traditionally, physical isolation is accomplished through physical separation, using multiple chips. In cases where a single chip solution is used, traditional techniques for physical separation and/or explicit routing cost valuable logic and routing resources and are typically implemented through careful and time-consuming designs. The user explicitly and painstakingly demarcates where each signal on the chip may route. The process is inefficient because traditional chip design concerns such as routability, timing, and power can not easily be optimized. Floorplanning for security is potentially time consuming, and can have a negative impact on other traditional FPGA concerns such as routability, timing, and power. Some other EDA tools require the user to specify exact routing of signals to achieve routing isolation by using "hard macros." However, demarcated floorplanning and hard macros often under-utilize resources and may be error-prone. As programmable logic devices (PLDs) become increasingly complex and capable, physically isolating secure components becomes more difficult.

Consequently, the techniques and mechanisms of the present invention are provided to prevent leakage between components on an FPGA in the presence of faults. Any programmable device that can be configured with multiple components and routing lines between the components is referred to herein as an FPGA. According to various embodiments, leakage is prevented by performing an iterative process. In particular embodiment, all signals in the design are initially routed normally using an existing routing algorithm. The routing problem involves selecting a set of routing resources on the chip for every signal that is specified in the design. All signals that do not violate security rules are locked. A set of signals for which information leakage between these signals would not constitute a leak of information (called a compatible set) becomes locked. The routing resources used by these signals are committed as locked or unchangeable.

Wire use is restricted based on security rules. In particular embodiments, reservations are created for locked resources on the chip. A reservation is a device that guarantees security even in the presence of device faults. It does this by marking resources that may be able to leak onto, or be leaked onto by, some signal in the design. Remaining nets are re-routed. According to various embodiments, any signals in the design that are not already locked and that violate the reservations created by earlier locked signals are rerouted. This process essentially involves legalizing an existing routing from the perspective of security. Any violations of security rules would be fixed here. After this step, no signal routed would violate the security of any signal that had been previously locked. According to various embodiments additional signals are then locked and the process repeats until all signals are locked.

FIG. 1 is a diagrammatic representation showing one example of a programmable chip applicable to the techniques of the present invention. Any device such as a Field Programmable Gate Array (FPGA) or a PLD that is configurable using a hardware descriptor language (HDL) such as Verilog or VHDL is referred to herein as a programmable chip. A programmable chip 101 includes logic elements 103, embedded memory, as well as other resources such as routing resources and hard coded logic blocks. The programmable chip uses different types of resources that can be interchangeably used in different allocations to implement a programmable chip. In one example, the programmable chip uses a mix of logic elements, embedded memory, and hard-coded logic for implementing each of the various components on the programmable chip.

According to various embodiments, the logic resources are logic elements (LEs) 103, logic array blocks (LABs) or logic cells. Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register, and preset/reset logic for the register.

Logic elements can also be used to implement various secure and non-secure components. For example, regions 105 and 109 may be secure regions having one or more secure components. Regions 107 and 111 may be non-secure regions having non-secure components. The programmable chip system components are connected using an interconnection fabric or routing resources. Any mechanism or logic for connecting components in a system is referred to herein as a routing resource. In one example, the routing resource is a physical wire on-chip that may be used to connect two logic components. Routing resources may also include multiplexers that connect several wires and the configuration RAM (CRAM) that controls which wires are connected through the multiplexer.

Referring to FIG. 1, lines 121, 123, 131 and 133 represent legal connections between logic components as intended. Lines 125, 127, and 129 represent various unintended information exchange between components that may or may not be a leak. Line 125 shows information exchange between two secure regions 105 and 109 that otherwise do not have legal connections. A legal connection is an intended information exchange that does not violate security constraints. Line 125 is a leak because these two regions otherwise have no connections. Line 127 shows information exchange between two legal signals 121 and 123 connecting a secure region and non-secure region. Because line 127 would result in misrepresenting data intended for region 107 to region 111, it is also a leak. Line 129 shows an unintended information exchange between two non-secure regions 107 and 111. Because the regions are not secured, this information exchange may or may not be a leak depending on security constraints defined by the user.

Unintended information exchange may occur as a result of a fault such as a soft fault or a hard fault. A soft fault is a single event upset (SEU). In one example, the output from a multiplexer may be changed by a single random event, such as a random particle or energy beam flipping the RAM or a broken transistor that remains open or closed. A hard fault may be a physical short between conductors or active device failures. Fabricating two wires too closely to each other may cause a physical short. Manufacturing defects in the semiconductor dielectric insulator may also cause a physical short.

A user can specify the number of random events against which the secure components are isolated. A typical number is 1 or 2 random events, but any number of events may be specified. However, not all random events would result in a fault that causes the type of unintended information exchange considered to be a leak. FIGS. 2A to 2M illustrate the various paths that random events can cause unintended information to exchange, some of which are considered a fault and a leak according to various embodiments and some are not. Note that these illustrations are examples. Depending on the device design and functionality requirements, rules of what constitutes a fault may be changed by redefining what signals are considered compatible. Thus more or fewer or different rules may be used. In accordance with various embodiments of the present invention, the techniques of applying the rules are not specific to any particular list of rules.

Figure 2A:
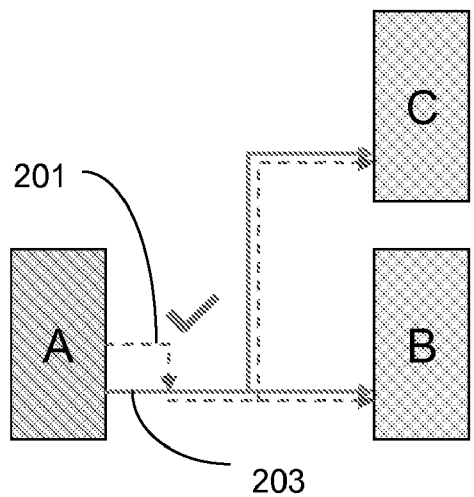

As shown in FIG. 2A, a local signal 201 in a secure region A may reach an inter-region signal 203 originating from the same secure region A and ending at non-secure regions C or B as long as the fault onto the inter-region signal occurs before any branching of the inter-region signal 203. This unintended information exchange has the same effect as if the exchange had happened inside secure region A—and these exchanges within a region are not considered to be faults.

Figure 2B:
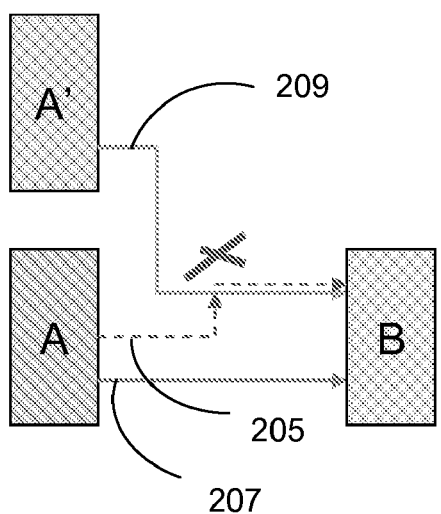
Figure 2C:
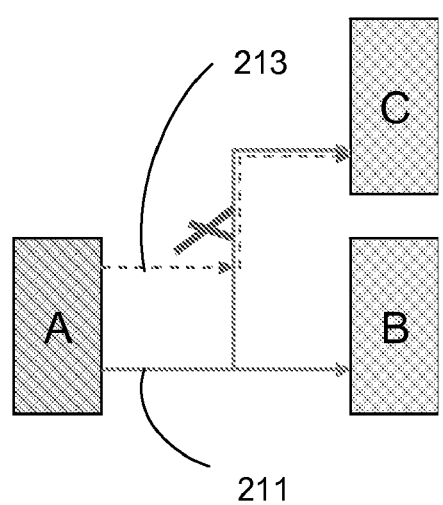

In FIG. 2B, a local signal 205 in a secure region A reaches an inter-region signal 209 that originates from a different region A'. Although there already exists an inter-region signal 207 between the two regions A and B, the unintended information exchange would change the number of crossings between regions and is considered to be a fault. In FIG. 2C, a local signal 213 reaches an inter-region signal 211 after a branch point. This is also considered a fault because the number of crossings between regions has changed.

Figure 2D:
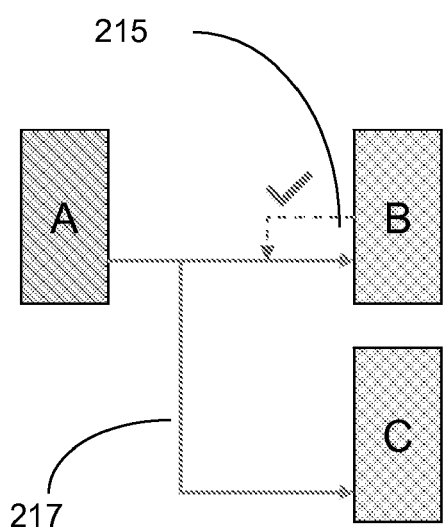
Figure 2E:
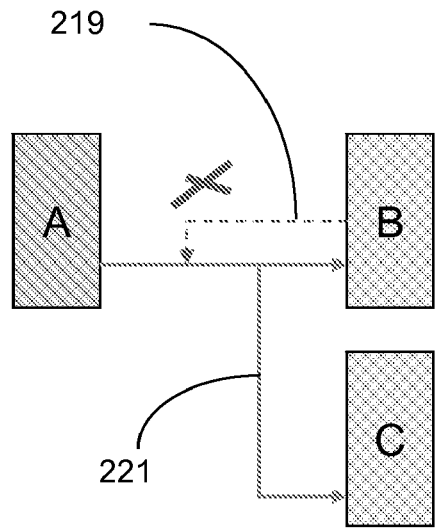

In FIG. 2D, a local signal 215 can reach an inter-region signal 217 entering the same secure region B if the fault happens on the inter-region signal 217 between the secure region B and any inter-region branch point on the inter-region signal 217. This unintended information exchange is not considered a fault. In FIG. 2E illustrate the corollary case from FIG. 2D where the local signal 219 exchanges onto the inter-regional signal 221 between the inter-region branch point and another secure region A. This exchange is a fault.

Figure 2F:
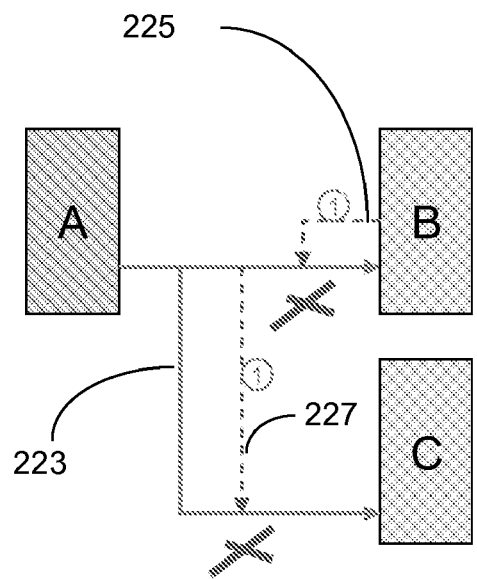

These illustrations consider modes where only one event occurs. When security against more than one random event is required, for example, two events, the possibility of the second event resulting in unintended information exchange to any other secure region must be considered. One such possibility is shown in FIG. 2F. A local signal 225 from region B may exchange onto inter-region signal 223 between the inter-region branch and the region B. If only one random event is considered, then this exchange would not be a fault, just like in FIG. 2D. However, for two random events, a subsequent exchange 227 between 225 to the other inter-region branch must be considered. Because the second event would create a crossing between regions B and C, it is a fault that applies to local signal 225.

FIGS. 2G and 2H illustrate situations when unintended information exchanges between inter-region signals are not faults. A first inter-region signal 231 may reach a second inter-region signal 229 originating from the same secure region A provided that the first inter-region signal 231 is exchanged onto the second inter-region signal 229 before the second inter-region region branches, as shown in FIG. 2G. This has the same effect as if the fault had happened inside secure region A. In FIG. 2H, an inter-region signal 239 from a secure region A' is connected to a secure region A. A local signal 235 from inter-region signal 239 exchanges onto another inter-region signal 237 that originated region A. In this case, the effect is also the same as if the fault had happened inside secure region A.

FIGS. 2I and 2J also illustrate situations when unintended information exchanges between inter-region signals are not faults. As shown in FIGS. 2I and 2J, a first inter-region signal 241 may also short via 245 onto a second inter-region signal 243 (even one sourced from a different secure region), as long as the fault does not cause the first inter-region signal to feed any region it was not already connected to.

For security modes with two random events, unintended information exchange as result of a second event is considered from the result of the first event. In other words, the subtree of the second inter-region signal that the first inter-region signal faults onto should be no less then two faults away from any region not connected to the first inter-region region, as shown in FIG. 2K. In FIG. 2K, the first random event causes inter-region signal 251 to exchange into inter-region signal 249 via after the inter-region branch. Without a second random event, the exchange is not considered a fault, just as in FIG. 2J. However, with a second event, the signal may be further exchanged via 255 to the other branch of inter-region signal 249, causing an additional region crossing to region C. Thus, the first event in FIG. 2K is a fault in a security mode with two random events.

In FIGS. 2L and 2M, an inter-region signal exchanges onto another inter-region signal. In both of these cases a fault occurs. As these illustrations show, a fault between secure regions and non-secure regions do not simply apply to cases where unintended information exchanges. In certain cases the unintended information exchanges are not considered to be faults if the same result may be obtained by an exchange internal to a region. The exchanges are also not considered to be faults if no additional crossings between regions are created by the unintended information exchange. These rules may be selectable by the user who requires different security functionality, or increased data integrity. Additional complexity is added when the security mode requires evaluation of more than one random event. In those cases not only the possibilities of the first event must be evaluated, but also all subsequent possibilities in terms of a second event must be evaluated. For complex wiring and routing that traverses many multiplexers across a chip, such evaluation may include a very high number of possibilities as the number of random events increases as security tightens.

In accordance with various embodiments of the present invention, the technique and tool described herein evaluates these possibilities and sets up a reservation area around the routing resources. The user specifies which hierarchies in the electronic design automation tool (EDA) need to be isolated and optionally a physical region that contains them. The hierarchies may be logic or hardware groups. The tool is then able to automatically enforce the security without further input from the user. For example, further inputs such as specifying interface regions or routing corridors or fencing regions or other routing assignments are not required. Thus, the level of user input and intervention is reduced.

The routing techniques described herein would not be observable by the user. The EDA tool implements the security requirements and the routing iterations. However, one observable feature is the "push-button" CAD solution, which is the first such solution to not require additional user constraints while effectively enforcing security restrictions and having minimal impact on quality of results. Another feature is the generic nature of the algorithms presented; they enforce, in a data-driven way, a wide variety of arbitrary security constraints that can be defined by the user. They can also be applied to many existing programmable chip (PLD and FPGA) routing algorithms. These techniques apply to a mix of secure and non-secure logic regions within a device, even with different security levels, such as top secret and secret and not secret. The computer-aided techniques allow high utilization of device even in the presence of secure regions and multiple event security modes.

According to various embodiments, a technique is provided for routing an electronic design to prevent information leakage between components. Signals are routed according to the electronic design. Usually, routing signals in the design involves using an existing routing algorithm without regard to signal security. The routing involves selecting a set of routing resources on the chip for every signal that is specified in the user's design based on the functionality of the design. The routing output may be used for programming the chip as well as for subsequent security verifications.

Compatible sets of signals are determined. A compatible set is a group of nets where any one signal in the set forming a fault path onto the net of another signal in the set does not cause in an illegal transfer of information. The various modes of possible transfers are discussed in FIGS. 2A to 2M. Generally, all signals that have the same starting or ending regions are compatible. Depending on the security rules and the difficulty of routing the design, one possible legitimate group of compatible sets consists of each net in a distinct set. The algorithm described, however, is accelerated by grouping multiple nets in a single compatible set.

After the compatible sets are determined, one or more compatible sets of signals are selected, and routing resources used by the one or more selected compatible sets are committed. These committed routing resources are locked or unchangeable until the compatible sets of signals are selected. Committed routing resources cannot be used to route other signals.

Reservations for committed routing resources are determined and set. The reservations are marked resources that may leak onto, or be leaked onto by, committed routing resources, within a specified number of faults. Reserved routing resources may only be used to route additional signals that are compatible with the branch of the net that generated the reservation. According to various embodiments, a reservation guarantees security even in the presence of device faults. The reservations take into account the specified number of faults by calculating all the possible modes of random events and information exchange. As the number of routing resources and specified number of faults increase, the size of the reservation around a compatible signal set increases. The reservation would include all configuration RAMs that are a specified number of faults away from any of the committed resources and all wires within a certain distance, for example a certain number of microns.

Signals corresponding to unselected compatible sets and other signals in the electronic design are rerouted. In certain cases, signals are rerouted only if they violate the reservations created by earlier locked signals. This operation involves legalizing an existing routing from the perspective of security—any violations of security rules regarding reserved or committed resources would be fixed. After this step, no signal routed would ever violate the security of any signal that had been previously locked.

In certain embodiments, the rerouting fails because not all remaining signals can have legal routes. In these embodiments, certain portions of the process are repeated with a different group of compatible signal sets and routing resources recommitted and reserved until all signals can be routed legally. The process may take a number of iterations to achieve a routing for every signal within the security constraints. Typically, the iteration starts by selecting all compatible signal sets. If a legal routing design cannot be found, then some selected compatible signal sets are deselected and process repeats. In a limited number of cases, the design with the security constraints may not fit on the device. The user may be notified after the rerouting fails a certain number of times to change or loosen the security constraints.

Figure 3:
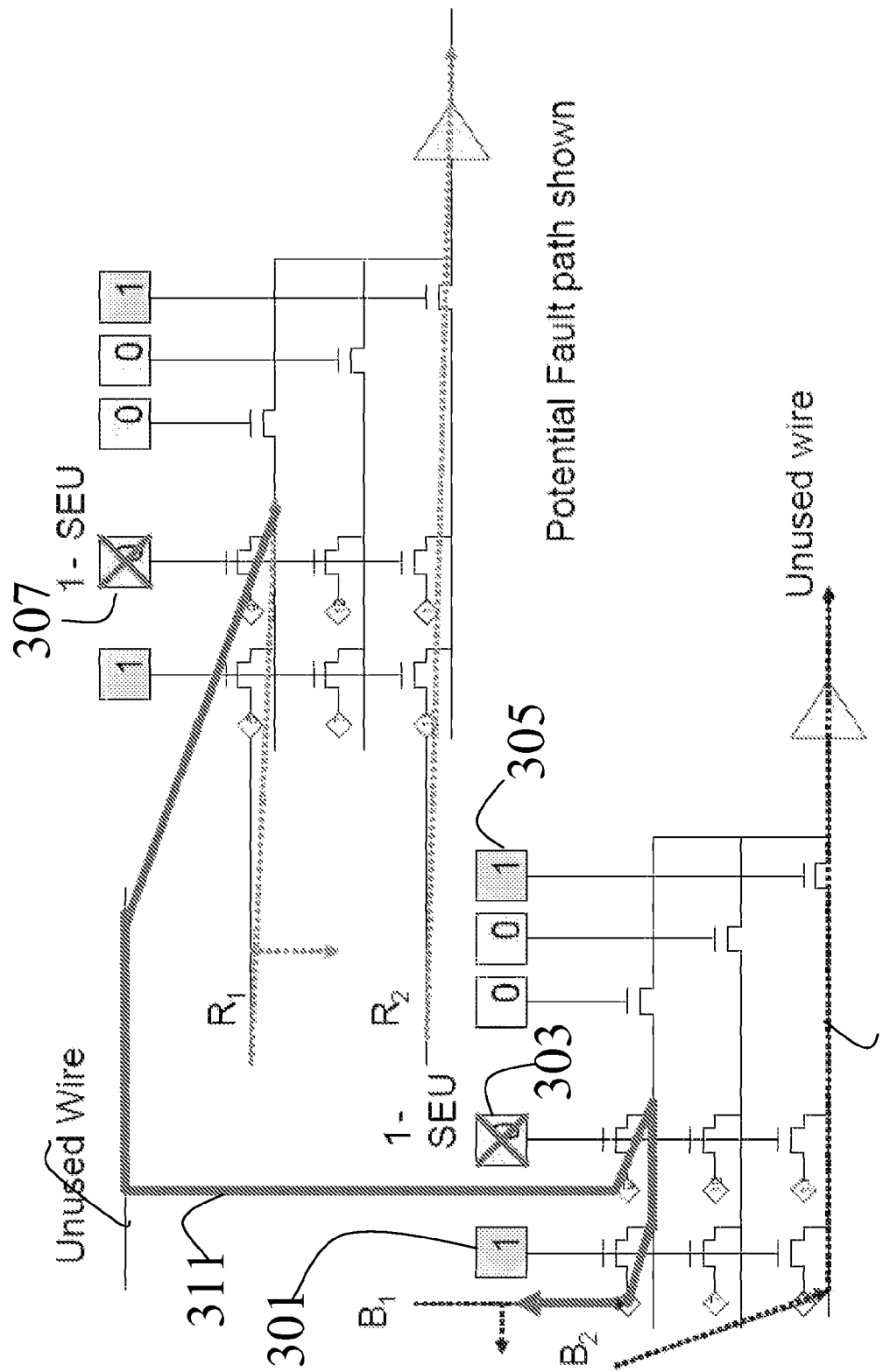
FIG. 3 is a diagrammatic representation showing an example where a subsequent signal route can make a previous signal route illegal.

The process takes later routing and security constraints into account. A change in CRAM settings can change the number of random events between two routing resources. For example, two resources that are a sufficient number of events apart can be turned into a leak by the toggling of some CRAM bit settings to parasitically connect them. FIG. 3 shows a scenario where the separation between two routes is reduced by the introduction of a third route, in a parasitic leak.

In FIG. 3, CRAMs are shown as boxes, such as 301, 303, 305, and 307. The settings are indicated as by a "1" or a "0" inside the box. Without routing signal B2, CRAMs 301, 303, 305, and 307 are all "0"s. Between signal B1 and signal R1, there exist three faults to produce a leak. Namely, CRAMs 301, 303, and 307 would all need to be turned on to cause an unintended information exchange between these two wires B1 and R1. These two wires are then sufficiently separated if the security mode is three events or less. However, a subsequently routed signal B2 (element 309) can change the degree of separation between B1 and R1 down to two faults. With respect to signal R1 and R2, B2 is a legal route. The additional route causes CRAMs 301 and 305 to be set and allowing the fault path 311 to occur if faults occur at 303 and 307.

As shown in FIG. 3, a later routed signal can change the fault separation between two earlier routed signals. Thus, an iterative technique on compatible sets is used to ensure the legality of previously routed signals. An "all-at-once" technique would have to keep track of all previously routed signals. The "all-at-once" technique would be beyond the capacity of most processors, especially for more complex designs. Thus solving both electrical- and leak-legalization simultaneously would be particularly difficult.

In other aspects, a technique to implement an electronic device is provided. An electronic design of the device is specified with signals associated with different security levels. Signals are routed and compatible sets of signals determined. Signals corresponding to one or more compatible sets of signals are locked and their routing resources are committed. Reservations for the committed resources are set, using the security requirement. If the one or more signals remaining un-locked violate a reservation, then a new legal route for the one or more signals is determined, using only uncommitted resources outside of incompatible reservations for committed resources. However, if no legal route is available, signal sets are unlocked to release routing resources. The process is repeated until all signals are legally routed without security violations.

Figure 4A:
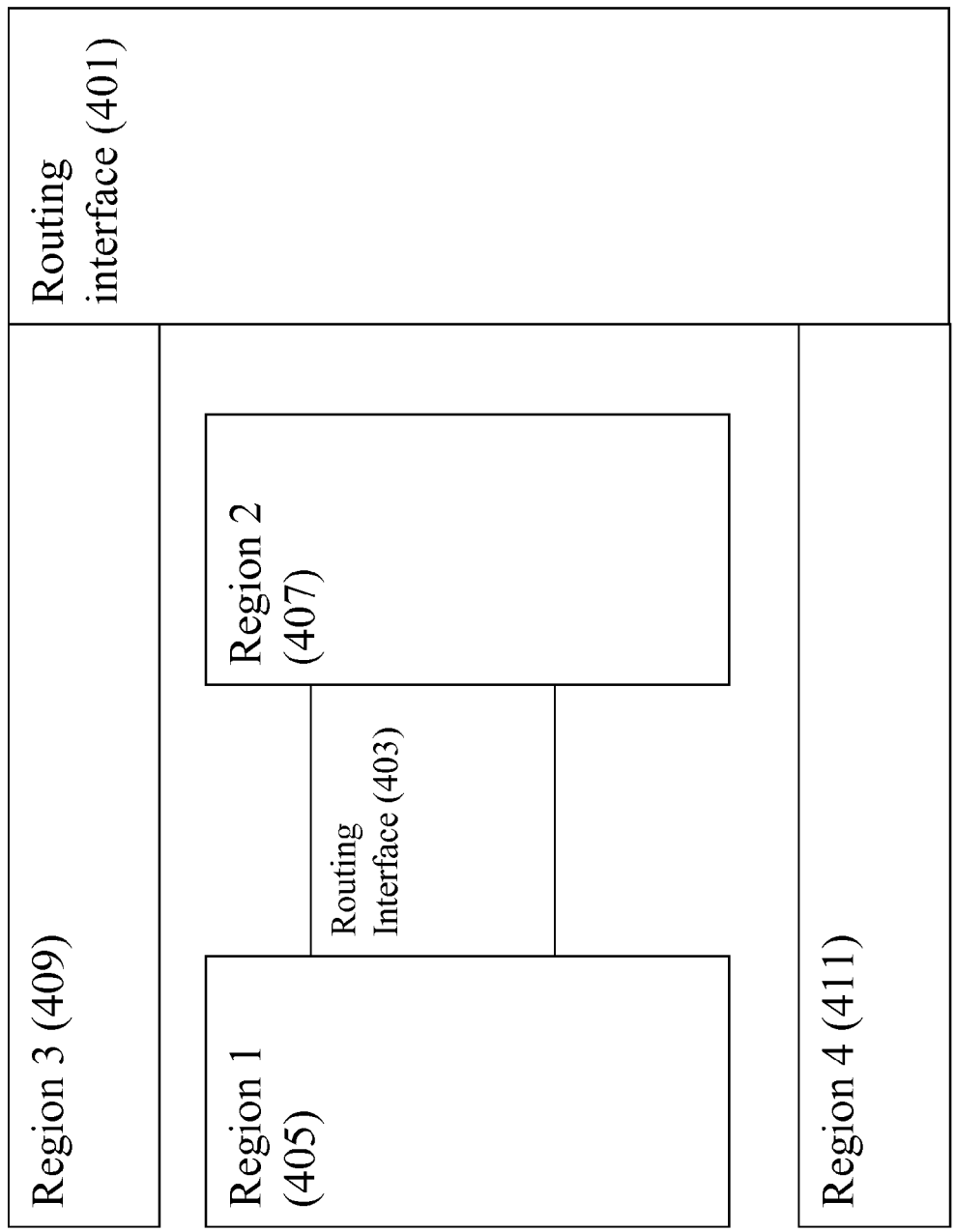
FIGS. 4A and 4B are floorplanning examples with and without a routing interface.
Figure 4B:
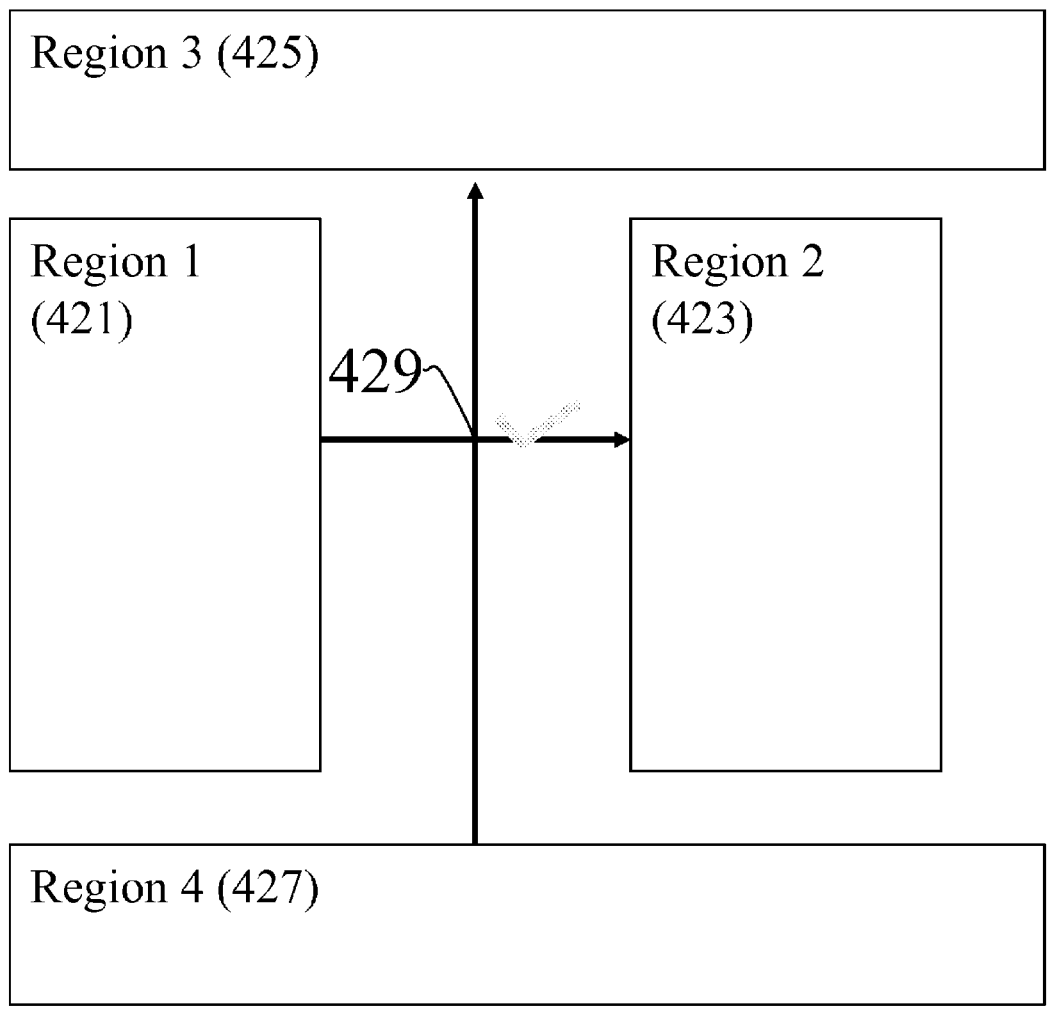

The technique may include floorplanning one or more secure regions using the electronic design specification and/ or laying out secure channels, though these steps are not required. FIGS. 4A and 4B are floorplanning examples. In FIG. 4A, the routing tool automatically floorplans all of the Regions 1-4 (405 to 411) and connects them up with routing interfaces 401 and 403. Regions 1 (405) and 2 (407) are connected via routing interface 403. Regions 3 (409) and 4 (411) are connected via routing interface 401. These routing interfaces 401 and 403 are secure channels through which all signals between the two connected regions must travel. Placement constraints (for example, I/O pin locations) may make the design difficult to floorplan in a planar manner as the number of regions to be connected and the sets of regions to connect increase. As shown in FIG. 4A, Region 2 (407) may not be connected to I/O pins at the periphery of the chip in a strictly planar floorplan. However, this approach provides transparency and allows easier user intervention, as all constraints can automatically be integrated.

FIG. 4B is another floorplanning example. In this example, the routing tool automatically floorplans all of the Regions 1 to 4 (421-427). The programmable chip is routed without secure channels (routing interfaces shown in FIG. 4A) using the techniques herein. This allows the tool to make full use of routing resources, such as two wires that can be routed perpendicularly without allowing the possibility of a data leak, as shown in junction 429. There is no need for routing interfaces at all because the disclosed technique would separate two incompatible signals by a minimum number of faults even if they were to physically cross horizontally.

According to various embodiments of the present invention, the techniques of the present invention are performed by assigning default reservation to resources, routing the signals of the electronic design, and locking and propagating.

An initial reservation is created on all of the routing resources on the chip based on the floorplan of the components. Each resource in the device is reserved by regions that it may leak onto or may leak onto it. A routing resource may be capable of sourcing from multiple regions and routing to multiple destination regions. For each region and every output, possible resources that can be leaked onto by the output within a specified number of faults are tagged. For each region and every input, possible resources that can leak onto the input within the specified number of faults are also tagged. This operation marks all resources that can only be used by signals to and from each region.

Routing is performed normally using standard routing tools, with certain constraints. For example, when evaluating a resource as a candidate for use in routing, the join of the net connection tag with the routing resource reservation is calculated. A net connection is a single destination on a single net. The net connection tag is in the form of $S(x) D(y)$, where x is the source region of the net and y is the destination region of the connection. The x, y arguments of the net connection tag must each point to a specific region. In another type of routing tool in which branch points were known in advance, a segment of routing would have a tag, representing the source region of the segment and set of destination regions that branch downstream of that segment.

The join is an operation that takes two reservations or tags and determines the security concerns for the interaction between those entities. The join determines if one connection's routing can safely use a wire that is already reserved, or if this interaction would constitute a leak. Further, it acts to combine two reservations into a single reservation that represents the most stringent reservation for that wire. It is a commutative function.

Resources can be reserved with the universe tag, meaning that they are compatible with signals to or from all regions. Thus, the join of any region with the universe tag results in the actual region, indicating a signal to/from that particular region is compatible with the resource. Resources may also be reserved with a set of regions, indicating that they are compatible only with signals to/from the precise same set of regions. In that case, the join operator of a set with itself returns the set. The join of region with itself results in itself, indicating that a signal to/from a given region is compatible with another signal with the same origin or destination. In any other case, the join operator returns "none" indicating that a signal and a resource are not compatible.

The join of two reservations is an operation that determines the compatibility of two pairs of reservations, with a reservation as an output with a format of Sout(s) Dout(d). Sout is the tag portion for the source of the joined reservation, and Dout is the tag portion for the destination of the joined reservation. For a join of two reservations, $S1(x) D1(y)$ and $S2(a) D2(b)$, the join result Sout(s) Dout(d) is calculated as follows. Argument "s" is the join of the source regions of the reservation –x and a-unless the result is none, then the join of x and b is used. Argument "d" is the join of the destination regions of the reservation –y and b-unless the result is none, then the join of the y and a is used.

Referring back to the routing operation, the join of the net connection tag and the routing resource reservation is first calculated. If the join results in "no region" for both source and destination, the resource may not be used. This step guarantees that a net does not leak into a region that it is not compatible with. Note that a leak may still happen from within a region where the connection does have its source or sink. For an inter-region connection with a tag $S(r)$, all resources used downstream of the first resource that does not have that r in the output of the join may not contain $S(r)$ or $D(r)$ in its reservation. This ensures that an inter-region net does not re-enter region r once it has exited the region. For an inter-region connection with tag $D(r)$, all resources used downstream of the first resource that has r in the output of the join must contain r in its reservation. This ensures that an inter-region net does not exit a region once it has entered the region.

A resource is evaluated as a candidate for a branch-point on an inter-region net, for a connection with $S(x) D(y)$ as its tag. If the inter-region net has not yet exited the region x, the branch point must be a resource that has a reservation containing x. If the inter-region net has exited the region x, but not yet entered region y, the branch point must be a resource that has "all regions" in its reservation. If the inter-region net has already entered region y, the branch point must be a resource that has y in its reservation. These rules ensure that a signal only exits a region once and only enters a region once.

These constraints combined with a standard routing algorithm can generate an electrically legal route that meets timing constraints and any other regular routing constraint. The routing also has precise region entrance and exit points, and no net is able to leak directly into a region where it does not belong. However, the route may contain leaks between inter-region routes. These kinds of leaks are addressed in the locking and propagation operations.

A compatible set is a group of nets where, if any signal in one set were to form a fault path onto any other net in the set, this would not form an illegal transfer of information. Illegal and legal transfers of information are discussed in association to FIGS. 2A to 2M. Note that depending on design requirements, the user may modify the legality of transfers. Each net in the electronic design is assigned to one compatible set. For example, the set of a region's intra-region nets forms one compatible set, since these nets may freely transfer onto one another—and this would only constitute a failure within a region, which is not considered a leak. Another example of a compatible set is the set of all nets that have the precise destination region set of {x, y, z}—any net within this set leaking onto any other net within this set would only constitute an information transfer to regions which are already privy to this information. An alternative valid group of compatible sets consists of every net in its own set. Due to the one-by-one locking nature of the algorithm, however, it is accelerated by grouping multiple nets in a single set.

Compatible sets are locked one-by-one. A single compatible set that has not already been locked is chosen for locking According to various embodiments, locking a set involves committing all of its routing resources to be used exclusively by that set. By design, the routing used by a single compatible set has been made fault-legal with respect to earlier reservations and legal with respect to all nets in the set.

Reservation information is propagated for all locked compatible sets. Propagation refers to the application of net reservations throughout the routing resources on the chip by modifying reservations. In general, the propagation algorithm traverses over the routing resources on chip, counting the distance in either an absolute sense or in faults, and modifying reservations along the way. Signals generate reservations from each routing resource used, indicating which sets of other signals are potentially compatible with the use of that resource. If a signal that is compatible with the particular branch of the net that generated the reservation were to leak onto that branch, no security rule violation would occur. Note that the reservation generated by a signal may be different before and after a branch point, since the set of destinations for each of those two wires segments is different.

A reservation can be propagated from one routing resource to another routing resource if those routing resources are connected by a hop. When a reservation is propagated, it modifies the reservations of the resources that it is propagated to, thereby determining the strictest constraint for use of that resource. Propagation can be upstream or downstream. Upstream propagations refer to a hop traversal, where the hop is from one resource to another resource that can form a leak onto it. Downstream propagations refer to hop traversals from one routing resource to another routing resource that it can form a leak onto. In all cases, the propagation stops when a specified number of logical or physical hops have been traversed. The number of hops to propagate is determined by the user according to the design.

Figure 5A:
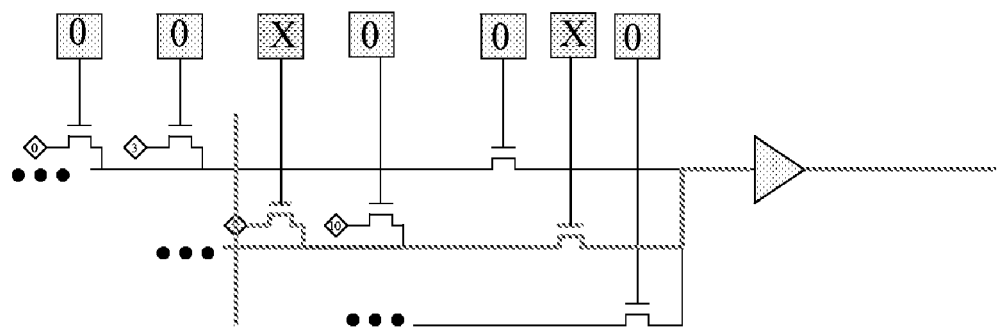
FIGS. 5A and 5B are examples of legitimate and not legitimate hops.
Figure 5B:
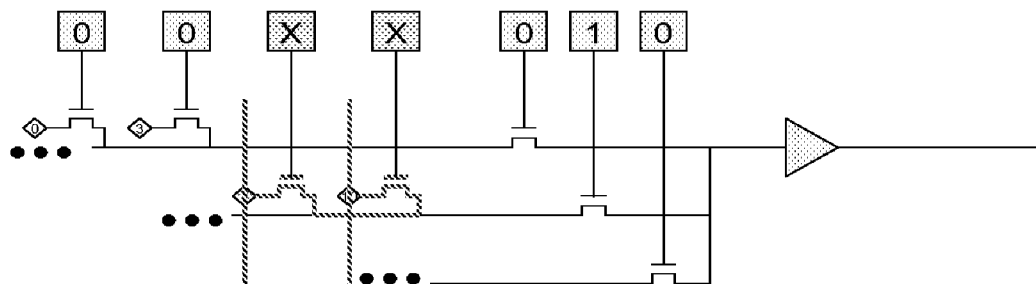

A hop is a connection between two routing resources on the chip. Hops between the routing resources represent both legitimate and illegitimate connections between the resources on the chip. An example of a legitimate connection would be a wire that is unused that has a used wire connected to some input of its driving MUX, as shown in FIG. 5A. One or more CRAM bit flips could connect this input to the output driver. Such CRAM bit flips are marked as "X". An example of an illegitimate connection between routing resources is shown in FIG. 5B. Two used wires that are both inputs to a third wire are parasitically connected through bit flips connecting them up at the input side of the third wire's driver. Every hop has a weight, representing the number of CRAM bit flips or physical distance parasitically connecting the two resources.

The reservations of all locked resources are propagated. There should be no fault-illegal routing between two locked net sets, since each compatible set was routed with the other net's reservations in place. This means that no locked resource's reservation should contain only "no region". However, resources that are not used or used by a net that is not locked net may contain a region or a "no region", the latter meaning that they are not usable by any net. Nets that are not locked that currently use a resource with a "no region" reservation or any other incompatible reservation must be re-routed.

After propagating reservations from a locked set, if no incompatible reservations are detected for a given non-locked compatible set, that set is chosen to be locked, and the propagation step is repeated for that set. If no such compatible set exists, that is, reservation incompatibilities are detected for all compatible sets, then the nets of all non-locked sets are re-routed. The new route obtained must be electrically legal, and must follow all reservations of locked compatible sets. After re-routing, the locking and propagating step repeats until all compatible sets have been locked.

As discussed herein, techniques in accordance with various embodiments provides for circumstances where subsequent routing changes the security characteristics of earlier routed signals. After each iteration, reservations are such that only legal routes remain for signals to be re-routed. Under the circumstances where the remaining signals cannot be routed using legal routes, then one or more compatible net sets may be unlocked and the process repeated until an entirely legal routing is found.

Figure 6:
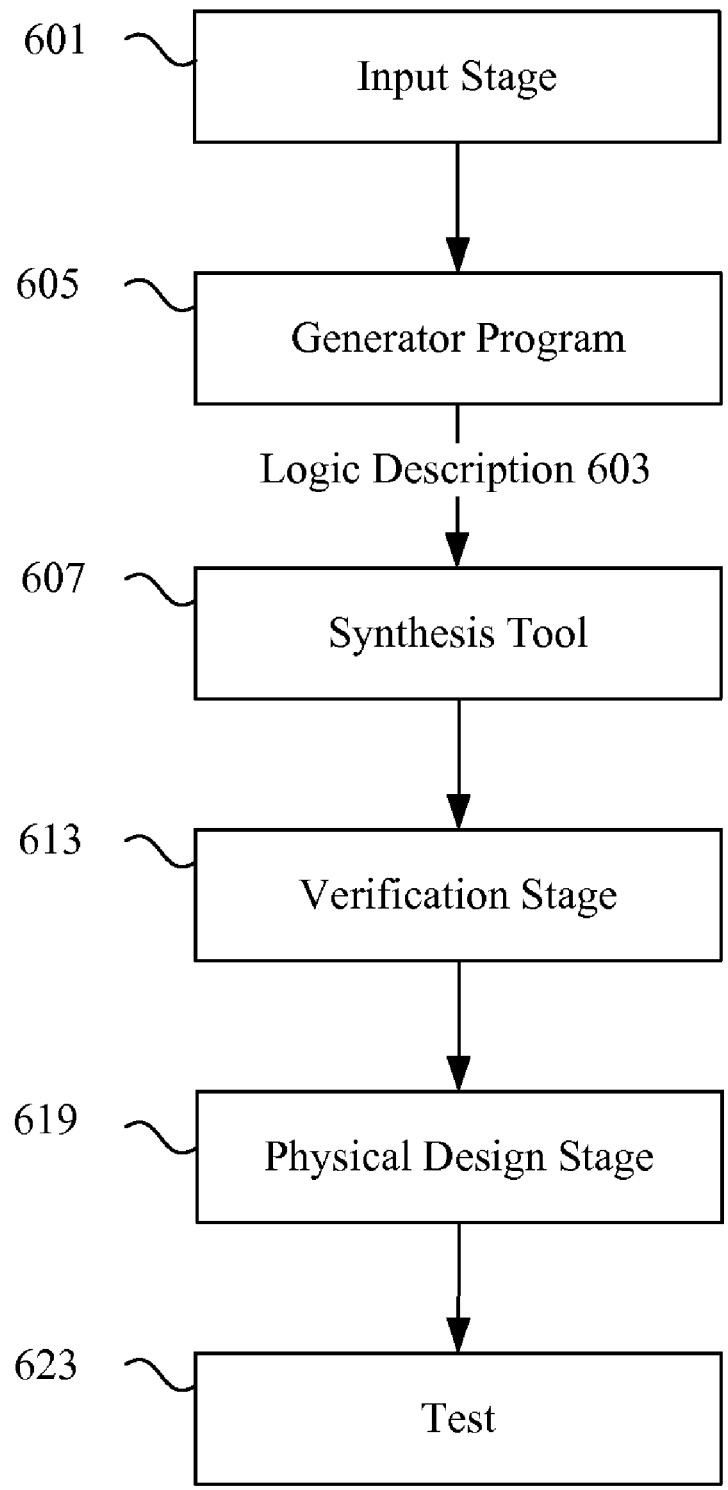
FIG. 6 is a diagrammatic representation showing a technique for implementing the programmable chip.

FIG. 6 is a diagrammatic representation showing implementation of an electronic device that can use the techniques of the present invention. An input stage 601 receives selection information typically from a user for logic such as a processor core as well as other components to be implemented on an electronic device. In one example, the input received is in the form of a high-level language program. A generator program 605 creates a logic description and provides the logic description along with other customized logic to any of a variety of synthesis tools, place and route programs, and logic configuration tools to allow a logic description to be implemented on an electronic device.

In one example, an input stage 601 often allows selection and parameterization of components to be used on an electronic device. The input stage 601 also allows configuration of hard coded logic. In some examples, components provided to an input stage include intellectual property functions, megafunctions, and intellectual property cores. The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected. At this stage, the user may enter security information about individual components that needs to be isolated. For example, different levels of component security and which components are allowed to communicate with each other may be entered.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. One tool with generator program capabilities is System on a Programmable Chip (SOPC) Builder available from Altera Corporation of San Jose, Calif. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 609.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool locates logic cells on specific logic elements of a target hardware device and connects wires between the inputs and outputs of the various logic elements in accordance with logic and security required to implement an electronic design. According to various embodiments of the present invention, the place and route tool may perform the techniques of the present invention to implement the various security requirements and rules as defined by the user. The iterative technique may be transparent to the user, but the resulting device can be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
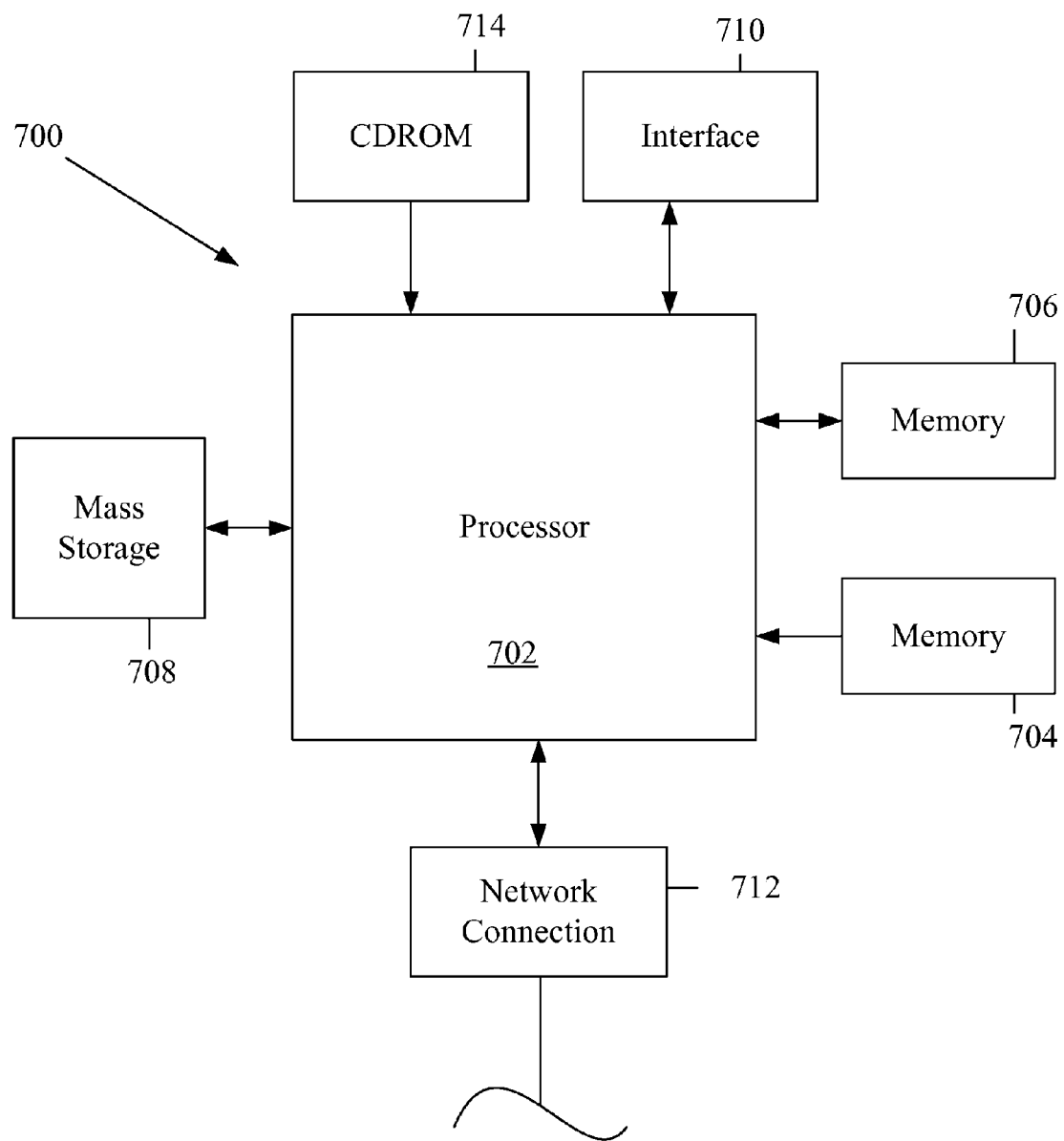
FIG. 7 is a diagrammatic representation depicting a computer system.

FIG. 7 is a diagrammatic representation showing a typical computer system that can be used to implement a programmable chip having distinct isolated components. The computer system 700 includes any number of processors 702 (also referred to as central processing units, or CPUs) that are coupled to devices including memory 706 (typically a random access memory, or "RAM"), memory 704 (typically a read only memory, or "ROM"). The processors 702 can be configured to generate an electronic design. As is well known in the art, memory 704 acts to transfer data and instructions uni-directionally to the CPU and memory 706 is used typically to transfer data and instructions in a bi-directional manner.

Both of these memory devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than memory. The mass storage device 708 can be used to hold a library or database of prepackaged logic or intellectual property functions, as well as information on generating particular configurations. It will be appreciated that the information retained within the mass storage device 708, may, in appropriate cases, be incorporated in standard fashion as part of memory 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 702 may be a design tool processor. Finally, CPU 702 optionally may be coupled to a computer or telecommunications network using a network connection as shown generally at 712. With such a network connection, it is contemplated that the CPU might receive information from the network, or might output information to the network in the course of performing the above-described process steps. It should be noted that the system 700 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method comprising:
routing signals in an electronic design to form legal connections between specified ones of a plurality of components including secure and non-secure components for implementation on a programmable chip;
selecting a compatible set of signals using a design tool processor, wherein the compatible set of signals is a set of signals for which a fault path formed between any two signals in the compatible set of signals would not cause an illegal transfer of information on a connection that is not part of the legal connections, wherein another fault path formed between two signals other than the compatible set of signals would cause an illegal transfer of information on another connection that is not part of the legal connections;
committing routing resources to be used by the compatible set of signals;
setting a reservation for the committed routing resources, wherein the reservation provides security regardless of presence of faults; and
rerouting signals other than the compatible set of signals.

2. The method of claim 1, further comprising selecting a second compatible set of signals from the rerouted signals using the design tool processor, wherein the second compatible set of signals is a set of signals for which a fault path formed between any two signals in the second set of signals would not cause an illegal transfer of information.

3. The method of claim 1, further comprising setting a reservation for committed routing resources, where the reservation provides security even in the present of faults.

4. The method of claim 2, further comprising rerouting signals not within the compatible set of signals and the second compatible set of signals.

5. The method of claim 1, further comprising receiving one or more security rules.

6. The method of claim 5, wherein the reservations for the committed routing resources are set based on the one or more security rules.

7. The method of claim 5, wherein the one or more security rules comprise a security level defining a leak as information capable of passing through a specific number of faults.

8. The method of claim 1, wherein the faults are soft faults or hard faults.

9. The method of claim 5, wherein the one or more security rules comprise defining one or more security regions.

10. The method of claim 9, wherein each security region is associated with a security level.

11. An apparatus comprising:
an interface configured to receive a plurality of components including secure and non-secure components for implementation by routing signals to form legal connections between specified ones of the secure and non-secure-components on a programmable chip; and
a processor configured to select a compatible set of signals and commit routing resources to be used by the compatible set of signals for which a fault path formed between any two signals in the compatible set of signals would not cause an illegal transfer of information on a connection that is not art of the legal connections, wherein another fault path formed between two signals other than the compatible set of signals would cause an illegal transfer of information on another connection that is not part of the legal connections;
wherein the processor is further configured to set a reservation for the committed routing resources and reroute signals other than the compatible set of signals, the reservation providing security even in the presence of faults.

12. The apparatus of claim 11, wherein the processor is further configured to select a second compatible set of signals from the rerouted signals, wherein the second compatible set of signals is a set of signals for which a fault path formed between any two signals in the second set of signals would not cause an illegal transfer of information.

13. The apparatus of claim 11, wherein the processor is further configured to set a second reservation for the committed routing resources, where the second reservation provides security even in the present of faults.

14. The apparatus of claim 12, wherein the processor is further configured to reroute signals other than the compatible set of signals and the second compatible set of signals.

15. The apparatus of claim 11, wherein the processor is further configured to receive one or more security rules.

16. The apparatus of claim 15, wherein the reservations for committed routing resources are set using the one or more security rules.

17. The apparatus of claim 15, wherein the one or more security rules comprise a security level defining a leak as information capable of passing through a specific number of faults.

18. The apparatus of claim 15, wherein the one or more security rules comprise defining one or more security regions.

19. The apparatus of claim 15, wherein each security region is associated with a security level.

20. A non-transitory computer readable medium comprising computer code embodied therein for execution using a processor, the computer readable medium comprising:
computer code for routing signals in an electronic design to form legal connections between specified ones of a plurality of components including secure and non-secure components for implementation on a programmable chip;
computer code for selecting a compatible set of signals using a design tool processor, wherein the compatible set of signals is a set of signals for which a fault path formed between any two signals in the compatible set of signals would not cause an illegal transfer of information on a connection that is not part of the legal connections, wherein another fault path formed between two signals other than the compatible set of signals would cause an illegal transfer of information on another connection that is not part of the legal connections;
computer code for committing routing resources used by the compatible set of signals;
computer code for setting a reservation for committed routing resources, wherein the reservation provides security even in the presence of faults; and
computer code for rerouting signals excluded from the compatible set of signals.

* * * * *